(12) United States Patent
Fleury et al.

(10) Patent No.: US 7,187,824 B2
(45) Date of Patent: Mar. 6, 2007

(54) METHOD OF PRODUCING AND IMPROVING AN OPTICAL TRANSMISSION LINE, AND ASSOCIATED COMPENSATION MODULES

(75) Inventors: Ludovic Fleury, Bois d'Arcy (FR); Pierre Sillard, Le Chesnay (FR); Alain Bertaina, Paris (FR); Florent Beaumont, Conflans Ste Honorine (FR); Maxine Gorlier, Paris (FR); Louis-Anne de Montmorillon, Paris (FR); Pascale Nouchi, Maisons-Lafitte (FR); Lionel Expert, Paris (FR)

(73) Assignee: Alcatel, Paris (FR)

( * ) Notice: Subject to any disclaimer, the term of this patent is extended or adjusted under 35 U.S.C. 154(b) by 72 days.

(21) Appl. No.: 10/620,369

(22) Filed: Jul. 17, 2003

(65) Prior Publication Data
US 2004/0028325 A1    Feb. 12, 2004

(30) Foreign Application Priority Data
Jul. 18, 2002    (FR) .................................. 02 09137

(51) Int. Cl.
*G02B 6/42*    (2006.01)
*H04J 14/02*    (2006.01)
(52) U.S. Cl. .......................................... 385/27; 398/81
(58) Field of Classification Search ............... 385/27, 385/123–127; 398/81, 147
See application file for complete search history.

(56) References Cited
U.S. PATENT DOCUMENTS
5,673,354 A * 9/1997 Akasaka et al. ............ 385/127

6,259,845 B1    7/2001 Sardesai
6,456,773 B1 *  9/2002 Keys .......................... 385/135
6,792,209 B1 *  9/2004 Eiselt .......................... 398/81
6,813,426 B2 * 11/2004 Fleury et al. ............... 385/123

FOREIGN PATENT DOCUMENTS
WO    WO 0065754    11/2000

OTHER PUBLICATIONS
Gruner-Nielsen et al, "Module for simultaneous C+L-band dispersion compensation and Raman amplification", OFC, vol. TuJ6, 2002, pp. 65-66, XP002236789.

* cited by examiner

*Primary Examiner*—Sung Pak
*Assistant Examiner*—Tina M. Wong
(74) *Attorney, Agent, or Firm*—Sughrue Mion, PLLC (57) ABSTRACT

The invention relates to methods of producing and improving an optical transmission line comprising the combination of a line optical fiber and an original or modified module for compensating the chromatic dispersion of said line optical fiber. The modified compensation module is a module for compensating chromatic dispersion of a line optical fiber (1) in a plurality of contiguous and non-overlapping spectral bands each covering at least 30 nanometers, the module including a structure (9) carrying a plurality of submodules (4, 8) at least one of which is separable from the structure (9), which are disposed in series, which are interconnected by one or more connections (6) identifiable to the naked eye without optical measurement and accessible from the exterior without damaging the module, and each of which includes a support to which is fixed at least one optical fiber (2, 7) for compensating chromatic dispersion, at least one optical fiber (2) of said plurality of compensation optical fibers (2, 7) having a compensation ratio from 0.9 to 1.1 for the center wavelength of one of said spectral bands, and at least two submodules (4, 8) having compensation optical fibers (2, 7) of different kinds.

18 Claims, 6 Drawing Sheets

| | C/C' nm | TYPE | LENGTH km | C@1550nm ps/(nm.km) | C'@1550nm ps/(nm².km) | Seff@1550nm µm² |
|---|---|---|---|---|---|---|
| 1 | 158 | DCF BAND C | 6.250 | -65 | -0.42 | 19 |
| 2 | | DCF BAND L | 6.220 | -66 | -0.37 | 18 |
| 3 | | DCF 3 | 6.220 | -67 | -0.37 | 20 |
| 4 | 200 | DCF BAND C | 5.500 | -72 | -0.37 | 17 |
| 5 | | DCF BAND L | 5.500 | -74 | -0.29 | 15 |
| 6 | 305 | DCF BAND C | 9.265 | -94 | -0.31 | 15 |
| 7 | | DCF BAND L | 9.000 | -97 | -0.30 | 15 |

FIG. 3

| | r1 (µm) | r2 (µm) | r3 (µm) | Δn1 (x1000) | Δn2 (x1000) | Δn3 (x1000) |
|---|---|---|---|---|---|---|
| 1 | 1.76 | 5.23 | 7.79 | 18.4 | -7.0 | 5.8 |
| 2 | 1.67 | 4.90 | 7.72 | 19.9 | -7.0 | 5.0 |
| 3 | 1.78 | 4.93 | 7.80 | 18.0 | -7.0 | 4.9 |
| 4 | 1.58 | 4.88 | 7.73 | 21.3 | -6.4 | 4.7 |
| 5 | 1.40 | 5.39 | 7.34 | 24.3 | -5.1 | 5.9 |
| 6 | 1.40 | 4.01 | 6.88 | 25.4 | -7.0 | 3.6 |
| 7 | 1.33 | 4.40 | 6.29 | 26.0 | -6.0 | 4.7 |

METHOD OF PRODUCING AND IMPROVING AN OPTICAL TRANSMISSION LINE, AND ASSOCIATED COMPENSATION MODULES

The invention relates to methods of producing and improving an optical transmission line comprising the combination of a line optical fiber and a module for compensating the chromatic dispersion of said line optical fiber. The invention also relates to an original compensation module, i.e. one associated with the line optical fiber from the outset, at the stage of installing the optical transmission line. The invention further relates to a modified compensation module, i.e. modified by the above method of improving the optical transmission line.

In the prior art, a distinction is made between single-band optical transmission lines and multiband optical transmission lines, both of which use, for compensating the chromatic dispersion of the line fiber, modules incorporating one or more chromatic dispersion compensating optical fibers (DCF).

One prior art single-band optical transmission line uses a compensation module comprising an optical fiber for compensating the line optical fiber concerned in the spectral band concerned. A drawback of that prior art is that it is relatively inflexible. If multiband use of an existing optical transmission line is required at a later stage, the compensation module must either be replaced in its entirety or used with other modules in parallel with it.

A prior art single-band optical transmission line described in Patent Application WO01/69822 uses a compensation module within which a plurality of compensating optical fibers of the same type are associated in series, the fibers all providing compensation in the spectral band concerned but differing from one another, for example by virtue of one of them undercompensating in the spectral band concerned while another overcompensates in the same spectral band; thus the series association of a plurality of compensation optical fibers provides improved compensation in the spectral band concerned, which amounts to widening said spectral band. A drawback of that prior art is that its wideband single-band optical transmission line compensation module is also fixed once installed, and can be replaced only in its entirety.

One prior art multiband optical transmission line uses a plurality of compensation optical fibers in parallel with wavelength division multiplexing and demultiplexing systems. A drawback of that prior art is that it is complex and costly.

A prior art multiband optical transmission line described in paper TuJ6 by Lars Grüner-Nielsen, "Module for simultaneous C+L-band dispersion compensation and Raman amplification", OFC 2002, 19/03/02, uses a module that combines two compensation optical fibers in series. The compensation optical fibers are chosen so that their series combination compensates the chromatic dispersion of the line optical fiber in band C and in band L, but neither of them is optimized for compensation in either band C or band L. That prior art also has the drawback of being fixed once installed.

According to the invention, the original compensation module is based on the use of a plurality of compensation fibers disposed in series to offer compensation that can become multiband compensation on the transmission line concerned. Likewise the modified compensation module offers compensation that is multiband. The invention proposes a method of producing an optical transmission line that is flexible, i.e. for which the number of spectral bands in which the chromatic dispersion compensated can increase without necessitating replacement of the entire compensation module, only a portion of the module. On the optical transmission line, for each new operating spectral band in which chromatic dispersion is to be compensated, it suffices to exchange one of the submodules of the compensation module; throughout the service life of the optical transmission line there is good compensation of chromatic dispersion over all the spectral bands in which the optical transmission line operates at that time, which guarantees good compensation quality for a lower overall cost. For example, consider a submodule C including an optical fiber providing compensation in band C, of which a length lo would be required to compensate a given line optical fiber, and a submodule L including an optical fiber providing compensation in band L, of which a length lo would be required to compensate the same line fiber, the two compensation optical fibers being chosen so that their series combination, each with a length of lo/2, offers good compensation in bands C and L. The production method consists of installing the line optical fiber with a compensation module from the outset, which module consists of two independent band C submodules associated in series, which yields an overall length of compensation optical fiber in band C equal to lo that is divided into two sublengths lo/2, one per submodule. The optical transmission line operates in band C over a time period of a few years, for example, with very good compensation in band C. After this initial period of operation, the improvement method replaces one of the band C submodules with a band L submodule, the resulting modified compensation module then consisting of the series association of a band C submodule and a band L submodule, the optical transmission line thereafter operating in bands C and L with good compensation in bands C and L. Replacement is easy because the submodules are separable from the structure of the modules and the connections between the submodules are, firstly, identifiable to the naked eye without necessitating optical measurements and, secondly, accessible from outside the module without damaging the module. Over the service life of the optical transmission line, a shorter length of compensation optical fiber is required, compared to the situation of using an original module optimized for compensation in band C that is later replaced in its entirety by a module optimized for compensation in bands C and L, with a comparable quality of compensation at all times in the service life of the optical transmission line. Similarly, installing an optical transmission line equipped from the outset with a "modified" compensation module can be envisaged if the optical transmission line is intended to operate in bands C and L, in which case the module consists of three submodules in series, i.e. two band C submodules and one band L submodule, and can evolve afterwards towards a modified compensation module for bands S, C and L, consisting of three submodules in series, i.e. a band S submodule, a band C submodule, and a band L submodule, or a modified compensation module for bands C, L, and U, consisting of three submodules in series, namely a band C submodule, a band L submodule, and a band U submodule.

The invention provides a module for compensating chromatic dispersion of a line optical fiber in a given spectral band, characterized in that the module includes a structure carrying a plurality of submodules at least one of which is separable from the structure, which are disposed in series, which are interconnected by one or more connections identifiable to the naked eye without optical measurement and accessible from the outside without damaging the module, and each of which includes a support to which is fixed at least one optical fiber for compensating chromatic dispersion in said spectral band, said compensation optical fiber being of the same kind for all the submodules. This module is referred to herein as an "original" module.

The invention also provides a module for compensating chromatic dispersion of a line optical fiber in a plurality of contiguous and non-overlapping spectral bands each covering at least 30 nanometers, characterized in that the module includes a structure carrying a plurality of submodules at least one of which is separable from the structure, which are disposed in series, which are interconnected by one or more connections identifiable to the naked eye without optical measurement and accessible from the outside without damaging the module, and each of which includes a support to which is fixed at least one optical fiber for compensating chromatic dispersion, at least one optical fiber of said plurality of compensation optical fibers having a compensation ratio from 0.9 to 1.1 for the center wavelength of one of said spectral bands, at least two submodules having compensation optical fibers of different kinds. This module is referred to herein as a "modified" module.

The invention further provides a method of producing an optical transmission line including a step of installing a line optical fiber and either an original compensation module for said line optical fiber or an existing modified compensation module for said line optical fiber.

The invention further provides a method of improving an optical transmission line comprising a line optical fiber and an existing and previously used original or modified compensation module for said line optical fiber, the method including one or more exchange steps each consisting in removing from said module a submodule and replacing it in said module by a submodule whose compensation optical fiber is of a different kind to the optical fiber of the submodule that has been removed, in order to obtain a modified module.

The invention will be better understood and its other features and advantages will become apparent in the light of the following description and the accompanying drawings, which are provided by way of example, and in which.

The method of the invention of producing an optical transmission line associates an original compensation module of the invention with a line optical fiber. The method of the invention of improving an optical transmission line replaces one of the submodules of an original compensation module of the invention to convert it into a modified compensation module of the invention. A modified compensation module of the invention can also be converted into a compensation module further modified in accordance with the invention by means of the method in accordance with the invention of improving the optical transmission line. Some steps of a method of the invention of producing an optical transmission line can be omitted in order to associate a modified compensation module of the invention with a line optical fiber at the installation stage. In the improvement method of the invention, at least one of the original submodules preferably has neither been nor is subjected to any of the exchange steps consisting in replacing it with a submodule whose compensation optical fiber is optimized in a spectral band different from its own, but can of course sometimes be replaced by an identical submodule or by a submodule whose compensation optical fiber is optimized in the same spectral band as that corresponding to a "standard" exchange.

The original or modified module of the invention has a structure which carries the submodules. At least one of the submodules can be separated from the structure of the module, and preferably a number of them, namely all the submodules that may have to be replaced, thus enabling them to be replaced individually. Another option is for all the submodules to be separable from the structure of the module. The submodules are preferably independent of one another, i.e. any submodule can be removed from the module without regard to the other submodules. Each submodule has its own support to which the compensation optical fibers that it contains are fixed; it preferably contains only one compensation optical fiber; however, it can contain a plurality, for example in the case of a plurality of line optical fibers in parallel or in a situation where a plurality of optical fibers in series are necessary to provide chromatic dispersion compensation for a spectral band. The compensation optical fiber is fixed to its support, which therefore retains said optical fiber. Each of the submodules preferably has its own casing, i.e. a support that is closed or virtually closed from the outside. The structure of the module can equally be an outer casing containing all the submodule casings or supports.

The submodules are interconnected by one or more connections, each of which can be identified by the naked eye, without optical measurements, and is accessible from outside the module without damaging the module, to facilitate replacement of a submodule with another submodule to improve the optical transmission line. The connection can be "fixed", for example, such as a weld that is identifiable or rendered identifiable, which has the merit of stability and low degradation of attenuation losses. The connection can also be "demountable", for example, in the manner of a connector, which has the merit of greatly facilitating replacement of a submodule. Other types of "fixed" or "semi-fixed" connection are possible, but should preferably be avoided in that they are not sufficiently stable in time, the transmission line generally being intended to be in service for several years, and at the very least for several months.

The original module comprises a plurality of submodules for compensating chromatic dispersion of a line optical fiber in a given spectral band. Said spectral band is preferably band C, but any other spectral band used by optical transmission lines can be envisaged. The submodules are disposed in series and the optical signal transmitted, on passing through the line optical fiber, therefore passes through the compensation optical fibers of the successive submodules. The submodules are independent of one another, for example, and are interconnected by connections each consisting of a connector or each comprising at least one connector, such as for example the following sequence: connector, component or optical fiber having a particular function, connector, or a plurality of connectors in the case of a transmission line including a plurality of line optical fibers in parallel. The connections can also each consist of a weld or each include at least one weld. Each submodule includes an optical fiber for compensating chromatic dispersion in the spectral band concerned, preferably only one such fiber. The compensation optical fiber is of the same kind for all the submodules, i.e. it is the same fiber having the same compensation ratio in the spectral band concerned, ignoring tolerances and fabrication errors, but different lengths of which may be used from one submodule to another.

The original compensation module preferably includes only two submodules. It can advantageously include three or four submodules. With more than three or four submodules, it becomes more difficult to design the compensation optical fibers so that the replacement of a submodule by another submodule allows the use of an additional spectral band with a good compensation ratio in all the spectral bands used on the optical transmission line.

The compensation optical fiber is preferably the same length for all the submodules; using submodules of identical design further reduces costs.

The spectral band concerned is preferably band C, i.e. the spectral band extending from a wavelength of approximately 1530 nanometers (nm) to a wavelength of approximately 1570 nm, since this is the spectral band in which line optical fibers have the lowest attenuation and that is given priority, i.e. that is used first when initially installing a single-band optical transmission line intended for multiband operation at a later time.

Figure 1:
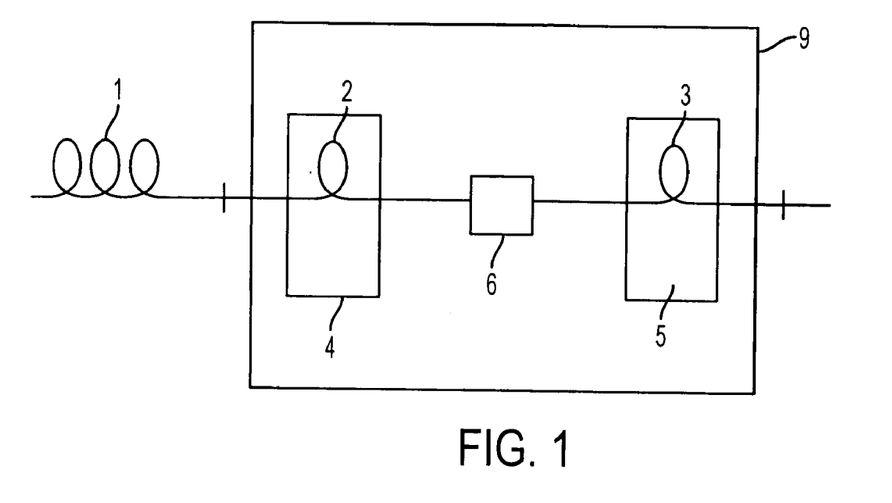
FIG. 1 shows diagrammatically one example of an original compensation module of the invention.

FIG. 1 shows diagrammatically one example of an original compensation module of the invention. The module comprises in succession: a line optical fiber 1; a first submodule 4 comprising a compensation optical fiber 2; a connector 6; and a second submodule 5 identical to the submodule 4 and comprising a compensation optical fiber 3 identical to the compensation optical fiber 2. A structure 9 taking the form of an outer casing encloses the above components.

The modified module is for compensating chromatic dispersion of a line optical fiber in a plurality of contiguous and non-overlapping spectral bands, for example bands S, C, L and U, although any other spectral band used by line optical fibers can be envisaged. To distinguish single-band optical transmission lines from multiband optical transmission lines, i.e. lines using a plurality of spectral bands in a wider spectral band, a spectral band is considered to cover at least 30 nm.

Figure 3:
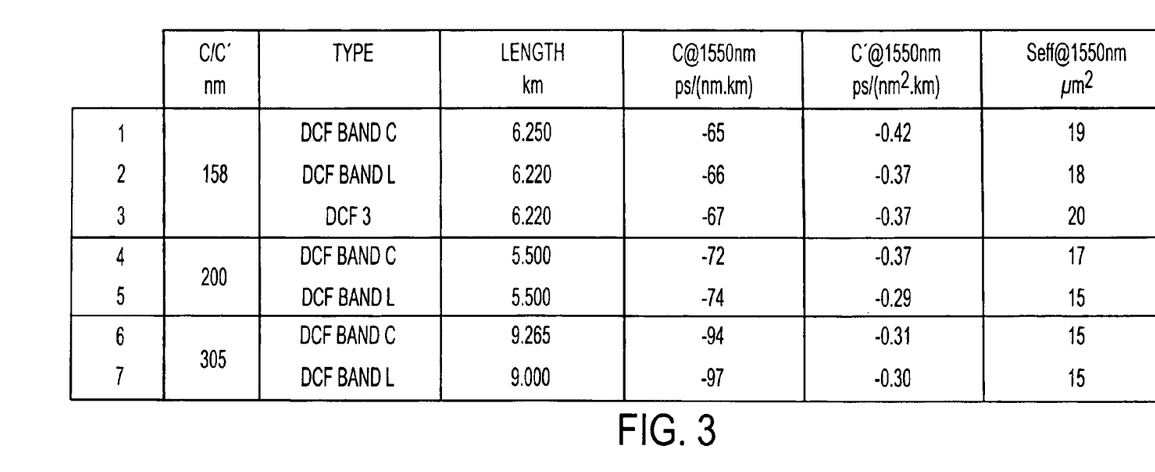
FIG. 3 shows diagrammatically the properties of examples of compensation fibers used in compensation modules of the invention.
Figure 4:
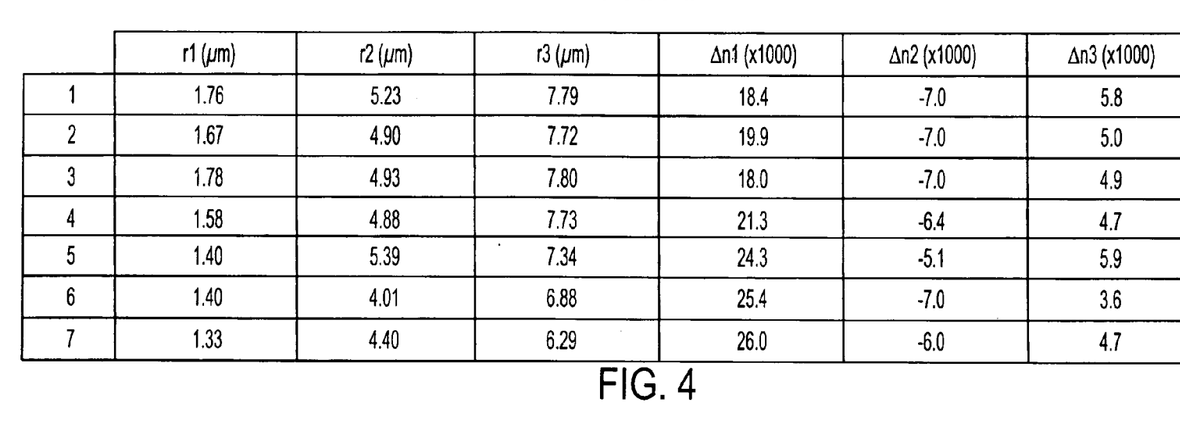
FIG. 4 shows diagrammatically the structures of examples of compensation fibers used in compensation modules of the invention.

The modified compensation module comprises a plurality of submodules in series, so that, on passing through the line optical fiber, the transmitted optical signal passes through the successive compensation optical fibers of the successive submodules. The submodules are independent of one another, for example, and are interconnected by connections each consisting of a connector or each including a connector, for example, as in the following sequence: connector, component or optical fiber having a particular function, connector, or a plurality of connectors in the case of a transmission line comprising a plurality of line optical fibers in parallel. The connections can also each consist of a weld or each include at least one weld. Each submodule includes one, and preferably only one, optical fiber for compensating chromatic dispersion in one of the spectral bands concerned. At least two submodules have compensation optical fibers of different kinds, i.e. have different compensation ratios as a function of wavelength, one being optimized in a given spectral band and the other in another spectral band, for example. A compensation optical fiber is considered optimized in a given spectral band if its compensation ratio for the center wavelength of said spectral band is from 0.9 to 1.1, provided of course that a suitable length is chosen. Each compensation optical fiber preferably has a compensation ratio from 0.9 to 1.1 for the center wavelength of one of the spectral bands. However, it is possible for only one of the compensation optical fibers to be optimized for one of the spectral bands, for example the compensation optical fiber contained in the submodules of the original module. In the case of a modified module compensating in bands C and L and comprising two submodules, for example, the first submodule having a compensation optical fiber optimized in band C, the second submodule preferably, but not necessarily, has a compensation optical fiber optimized in band L, and said optical fiber need not be optimized in any spectral band (this is the case of Example 3, for the fiber designated DCF 3, as shown in FIGS. 3 and 4 and described below); nevertheless, its series combination with the compensation optical fiber of the first submodule must nevertheless offer good compensation in bands C and L.

The modified compensation module preferably comprises only two submodules. It can advantageously also include three or four submodules. With more than three or four submodules, it becomes more difficult to design compensation optical fibers so that the replacement of one submodule by another submodule allows the use of an additional spectral band with a good compensation ratio in all the spectral bands used on the optical transmission line.

The compensation optical fiber is preferably the same length for all the submodules; using submodules of identical design further reduces costs.

The spectral bands concerned are preferably bands C and L, i.e. the spectral bands from a wavelength of approximately 1530 nm to a wavelength of approximately 1570 nm for band C and from a wavelength of approximately 1570 nm to a wavelength of approximately 1610 nm for band L.

Figure 2:
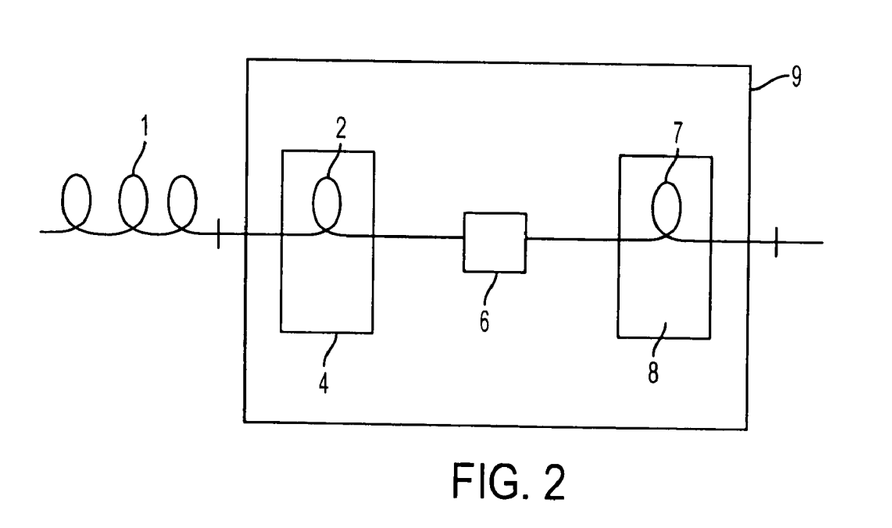
FIG. 2 shows diagrammatically one example of a modified compensation module of the invention.

FIG. 2 shows diagrammatically one example of a modified compensation module of the invention. The module comprises in succession: a line optical fiber 1; a first submodule 4 comprising a compensation optical fiber 2; a connector 6; and a second submodule 8 different from the submodule 4 and comprising a compensation optical fiber 7 different from the compensation optical fiber 2, the compensation optical fibers 2 and 7 being optimized in respective different contiguous and non-overlapping spectral bands, the wavelength of 1570 nm forming the boundary between them. A structure 9 in the form of an outer casing encloses the above components.

In the case of a two-band optical transmission fiber, the modified compensation module comprises two submodules in series connected by a connector, for example. A first spectral band B1 has a center wavelength $\lambda_1$ and a contiguous and non-overlapping second spectral band B2 has a center wavelength $\lambda_2$. A preferred method of determining the trend of the chromatic dispersion of each of the two compensation optical fibers in each of the two spectral bands is described below. Let L, $L_1$, $L_2$ respectively be the length of the line optical fiber, the length of the first compensation optical fiber F1 in the first spectral band B1, and the length of the second compensation optical fiber F2 in the second spectral band B2. Let $C(\lambda)$, $C_1(\lambda_1)$, $C_2(\lambda_2)$ be the respective chromatic dispersions of the line optical fiber, the first compensation optical fiber F1 in the first spectral band B1, and the second compensation optical fiber F2 in the second spectral band B2.

For a given application, let M be the maximum cumulative chromatic dispersion that is acceptable for the optical transmission line, consisting of the line optical fiber, the first compensation optical fiber F1, and the second compensation optical fiber F2, at the respective center wavelengths $\lambda_1$ and $\lambda_2$ of the spectral bands B1 and B2. The following conditions, in which M is preferably from 0 to 50 ps/nm, therefore apply at these two center wavelengths:

$$|LC(\lambda_1)+L_1C_1(\lambda_1)+L_2C_2(\lambda_1)| \leq M \quad (1)$$

$$|LC(\lambda_2)+L_1C_1(\lambda_2)+L_2C_2(\lambda_2)| \leq M \quad (1)$$

Let $N_1$ be the cumulative chromatic dispersion at the center wavelength $\lambda_1$ of the spectral band B1 for the optical transmission line if the compensation module were to comprise two identical submodules each incorporating a compensation fiber F1. The following condition would then apply at the center wavelength $\lambda_1$:

$$LC(\lambda_1)+2L_1C_1(\lambda_1)=N_1 \quad (2)$$

Let $N_2$ be the cumulative chromatic dispersion at the center wavelength $\lambda_2$ of the spectral band B2 for the optical transmission line if the compensation module were to comprise two identical submodules each incorporating a compensation fiber F2. The following condition would then apply at the center wavelength $\lambda_2$:

$$LC(\lambda_2)+2L_2C_2(\lambda_2)=N_2 \quad (3)$$

The values of $N_1$ and $N_2$ are preferably made equal, and range from 0 to 50 ps/nm, so that the combination of the two identical submodules offers good chromatic dispersion compensation in a spectral band.

Consider limited developments of the chromatic dispersions of the fibers F1 and F2 in the following form:

$$C_1(\lambda)=a_1+b_1(\lambda-\lambda_1)+c_1/2(\lambda-\lambda_1)^2+o(\lambda^3) \quad (4)$$

$$C_2(\lambda)=a_2+b_2(\lambda-\lambda_2)+c_2/2(\lambda-\lambda_2)^2+o(\lambda^3) \quad (4)$$

For optical fibers for which the terms of third or higher order would not be negligible, the usual numerical methods remain applicable. These numerical methods enable the conditions (1) to be satisfied for a greater number of wavelengths.

The coefficients $a_1$ and $a_2$ are determined from equations (2) and (3).

Let $\tau_1$ and $\tau_2$ be the compensation ratios of the fibers F1 and F2, respectively, with values ranging from 0.9 to 1.1, for the combination of two identical submodules offering good chromatic dispersion compensation ratios in a spectral band, said compensation ratios being defined by the following equations, in which C' is the chromatic dispersion slope of the line optical fiber:

$$\frac{b_1}{a_1} = \tau_1\left(\frac{C'(\lambda_1)}{C(\lambda_1)}\right) \quad (5)$$

$$\frac{b_2}{a_2} = \tau_2\left(\frac{C'(\lambda_2)}{C(\lambda_2)}\right) \quad (5)$$

Once the coefficients $a_1$ and $a_2$ have been determined from equations (2) and (3), the coefficients $b_1$ and $b_2$ can be determined from equations (5).

Substituting equations (4) in equations (1), and using equations (2) and (3), we obtain:

$$C_{1m} \leq c_1 \leq 0 \quad (6)$$

$$c_{2m} \leq c_2 \leq 0 \quad (6)$$

in which:

$$c_{1m} = -\frac{2a_1}{\Delta^2 f_1}\left(-2M+2N_1-f_2+f_1+\frac{b_1}{a_1}\Delta f_1\right)$$

$$c_{2m} = -\frac{2a_2}{\Delta^2 f_2}\left(-2M+2N_2-f_1+f_2-\frac{b_2}{a_2}\Delta f_2\right)$$

$$f_i = LC(\lambda_i) - N_i (i=1,2); \Delta = \lambda_2 - \lambda_1$$

Conditions (6) must be satisfied by the coefficients $c_1$ and $c_2$ of the fibers F1 and F2.

FIG. 3 shows diagrammatically the properties of examples of compensation fibers used in compensation modules of the invention. FIG. 3 takes the form of a table with seven columns and eight rows. The first row specifies properties of the chromatic dispersion compensation optical fibers. The next seven rows correspond to seven examples of compensation optical fibers. The first column gives the numbers of the examples. The second column gives the ratio, expressed in nm, between the chromatic dispersion and the chromatic dispersion slope at a wavelength of 1550 nm. The third column gives the type of compensation optical fiber, DCF band C indicating a compensation optical fiber optimized in band C, DCF band L indicating a compensation optical fiber optimized in band L, and DCF 3 indicating a compensation optical fiber that is not optimized either in band C or in band L. The fourth column gives the length in kilometers (km) of compensation optical fiber used in the corresponding submodule, when the length of the line optical fiber is 100 km. The fifth column gives the chromatic dispersion in ps/(nm.km) at the wavelength of 1550 nm. The sixth column gives the chromatic dispersion slope in ps/(nm2. km) at the wavelength of 1550 nm. The seventh and last column gives the effective surface area in µm2 at a wavelength of 1550 nm.

FIG. 4 shows diagrammatically the structures of examples of compensation fibers used in the compensation modules of the invention. FIG. 4 takes the form of a table comprising seven columns and eight rows. The first row gives the names of the structural elements of the chromatic dispersion compensation optical fibers. The next seven rows correspond to seven examples of compensation optical fibers. The first column gives the numbers of the examples. The next three columns give the outside radii of three respective slices constituting the core (in the wide sense, i.e. the variable portion of the index profile extending from the center to the constant index exterior cladding) of each of the compensation optical fibers, expressed in micrometers (µm). The last three columns respectively give 1000 times the index differences between, firstly, the three slices constituting the core (in the wide sense, i.e. the variable portion of the index profile extending from the center to the constant index exterior cladding) of each of the compensation optical fibers and, secondly, the constant index exterior cladding of said compensation optical fibers. All the compensation optical fibers considered correspond to an index profile including a core (in the narrow sense, i.e. the central section of the profile conveying most of the energy), a buried interior cladding and a ring.

FIGS. 5, 7, 9 and 11 show diagrammatically, as a function of wavelength, the cumulative chromatic dispersion on a transmission line including examples of compensation fibers as described with reference to FIGS. 3 and 4. The cumulative chromatic dispersion in ps/nm for the whole of the optical transmission line including the line fiber and the two compensation optical fibers connected in series is plotted on the ordinate axis. The wavelength in nm is plotted on the abscissa axis. Each curve indicates, as a function of wavelength, the cumulative chromatic dispersion of an optical transmission line consisting of the line optical fiber, a first submodule comprising a compensation optical fiber, and a second submodule comprising a compensation optical fiber, these components being disposed in series.

Figure 5:
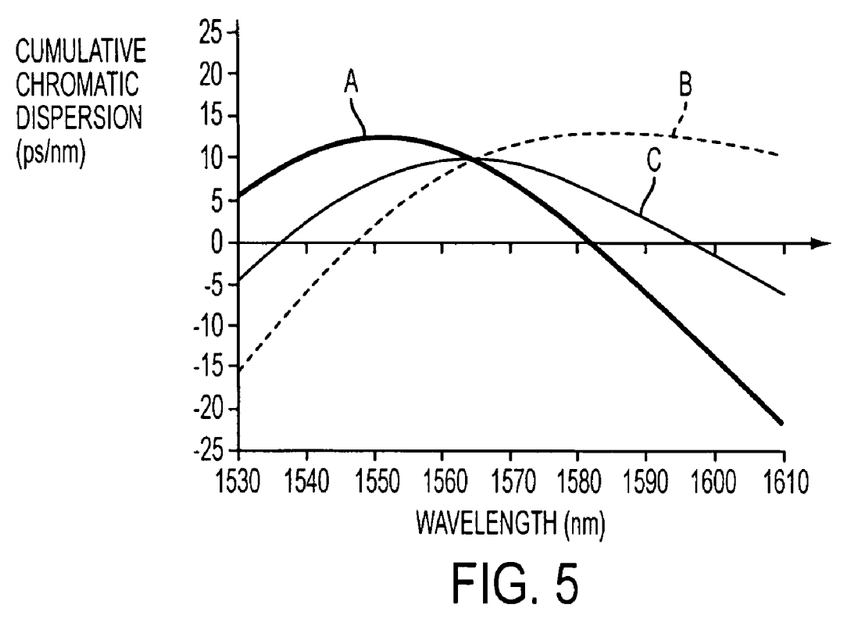
FIGS. 5, 7, 9 and 11 show diagrammatically, as a function of wavelength, the cumulative chromatic dispersion over 100 km of an optical transmission line including examples of compensation fibers described with reference to FIGS. 3 and 4.

Consider FIG. 5. For the curve A, the first submodule incorporates a compensation optical fiber corresponding to Example 1 and the second submodule incorporates a compensation optical fiber also corresponding to Example 1. For the curve B, the first submodule incorporates a compensation optical fiber corresponding to Example 2 and the second submodule incorporates a compensation optical fiber also corresponding to Example 2. For the curve C, the first submodule incorporates a compensation optical fiber corresponding to Example 1 and the second submodule incorporates a compensation optical fiber corresponding to Example 2.

Figure 7:
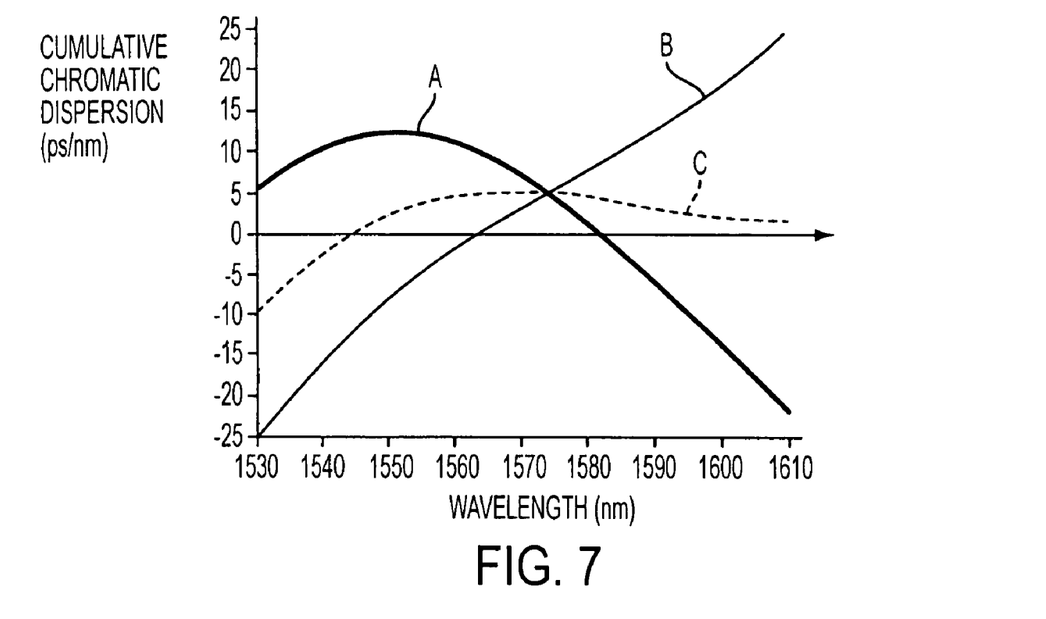

Consider FIG. 7. For the curve A, the first submodule incorporates a compensation optical fiber corresponding to Example 1 and the second submodule incorporates a compensation optical fiber also corresponding to Example 1. For the curve B, the first submodule incorporates a compensation optical fiber corresponding to Example 3 and the second submodule incorporates a compensation optical fiber also corresponding to Example 3. For the curve C, the first submodule incorporates a compensation optical fiber corresponding to Example 1 and the second submodule incorporates a compensation optical fiber corresponding to Example 3.

Figure 9:
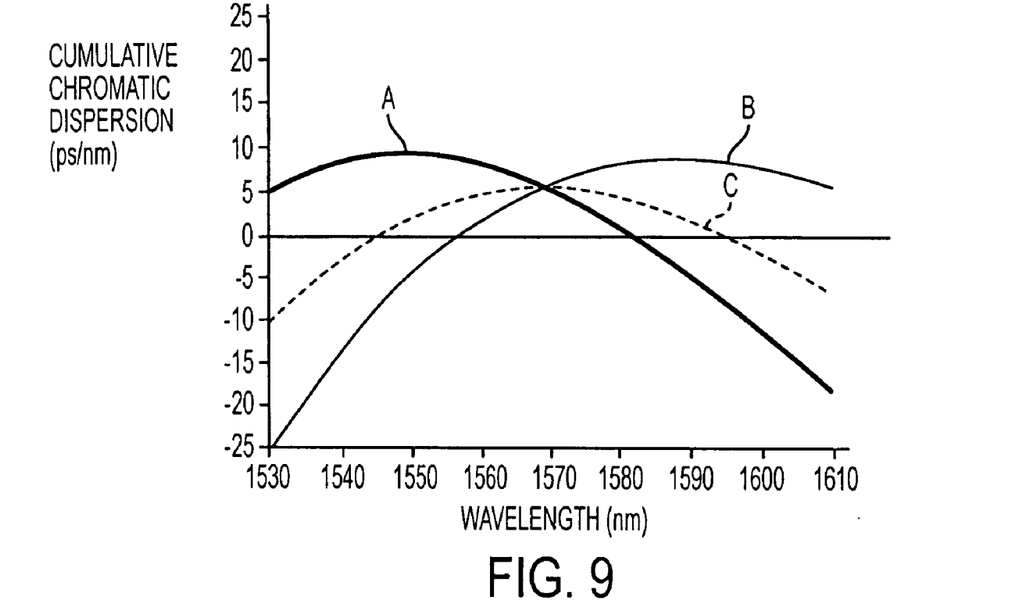

Consider FIG. 9. For the curve A, the first submodule incorporates a compensation optical fiber corresponding to Example 4 and the second submodule incorporates a compensation optical fiber also corresponding to Example 4. For the curve B, the first submodule incorporates a compensation optical fiber corresponding to Example 5 and the second submodule incorporates a compensation optical fiber also corresponding to Example 5. For the curve C, the first submodule incorporates a compensation optical fiber corresponding to Example 4 and the second submodule incorporates a compensation optical fiber corresponding to Example 5.

Figure 11:
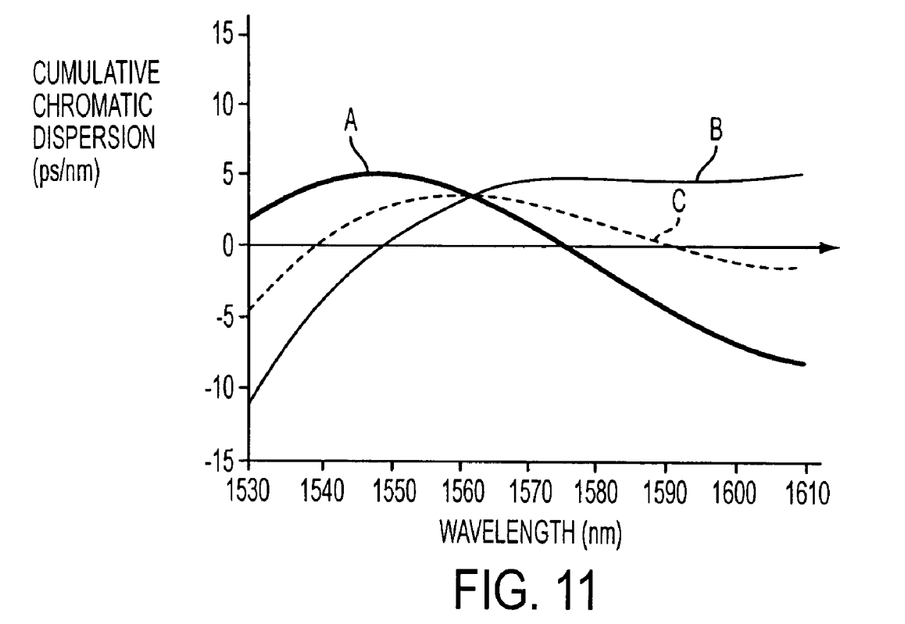

Consider FIG. 11. For the curve A, the first submodule incorporates a compensation optical fiber corresponding to Example 6 and the second submodule incorporates a compensation optical fiber also corresponding to Example 6. For the curve B, the first submodule incorporates a compensation optical fiber corresponding to Example 7 and the second submodule incorporates a compensation optical fiber also corresponding to Example 7. For the curve C, the first submodule incorporates a compensation optical fiber corresponding to Example 6 and the second submodule incorporates a compensation optical fiber corresponding to Example 7.

In all of FIGS. 5, 7, 9 and 11, the curves A show that single-band compensation in band C is good and the curves C show that two-band compensation in bands C and L is also good.

FIGS. 6, 8, 10 and 12 show diagrammatically as a function of wavelength the chromatic dispersions of examples of compensation fibers as described with reference to FIGS. 3 and 4.

The chromatic dispersion in ps/nm.km for the compensation optical fiber concerned is plotted on the ordinate axis. The wavelength in nm is plotted on the abscissa axis.

Figure 6:
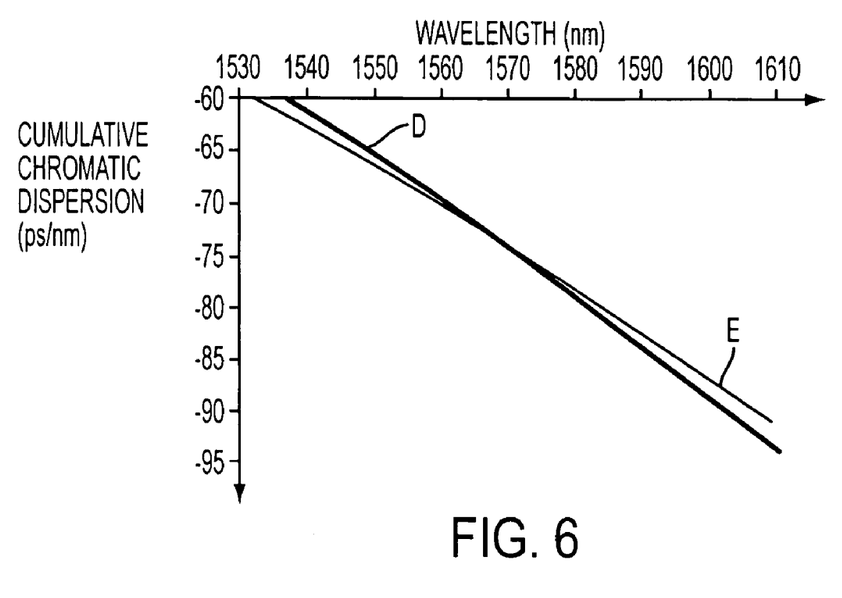
FIGS. 6, 8, 10 and 12 show diagrammatically, as a function of wavelength, the chromatic dispersions of examples of compensation fibers described with reference to FIGS. 3 and 4.

In FIG. 6, curve D corresponds to the compensation fiber of Example 1 and curve E corresponds to the compensation fiber of Example 2.

Figure 8:
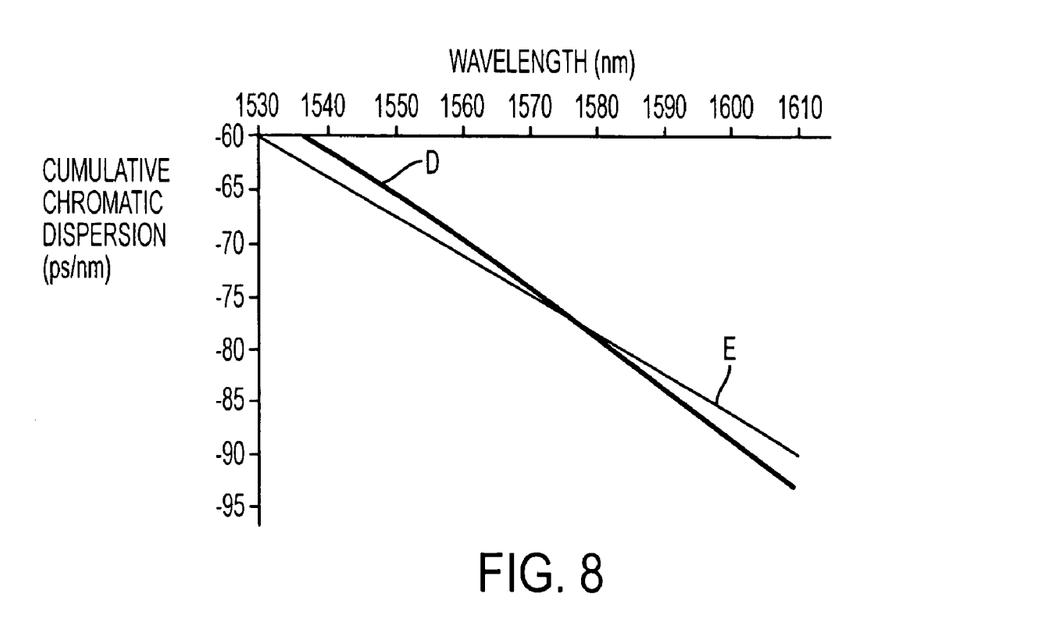

In FIG. 8, curve D corresponds to the compensation fiber of Example 1 and curve E corresponds to the compensation fiber of Example 3.

Figure 10:
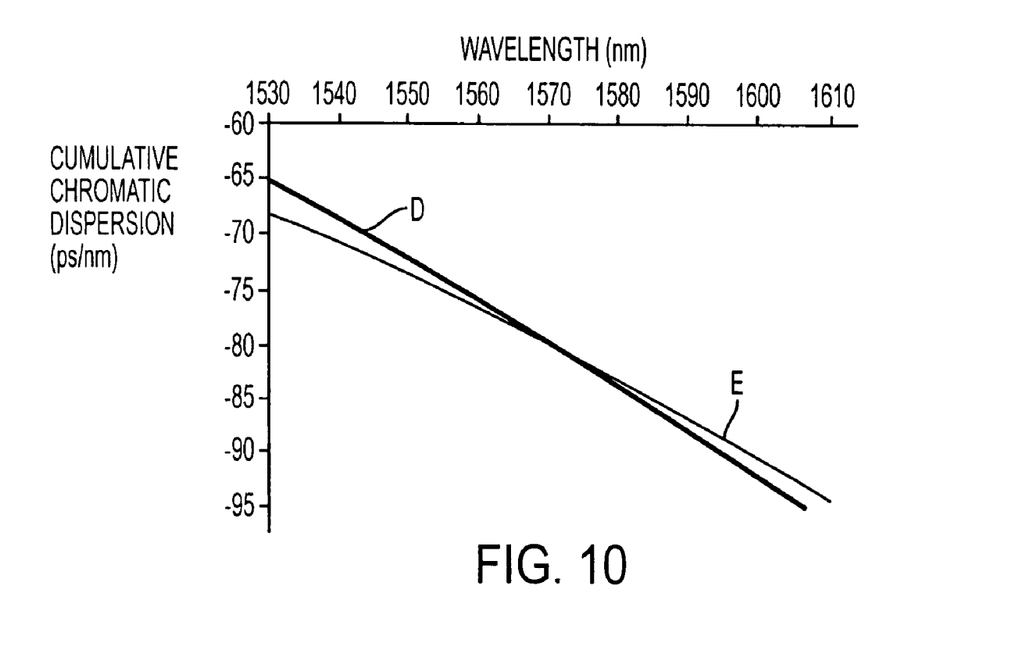

In FIG. 10, curve D corresponds to the compensation optical fiber of Example 4 and curve E corresponds to the compensation fiber of Example 5.

Figure 12:
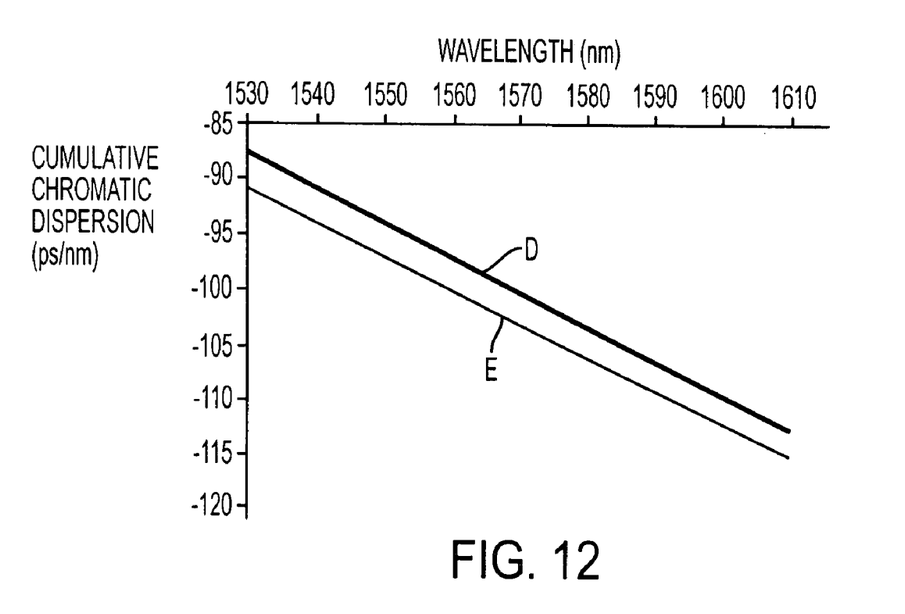

In FIG. 12, curve D corresponds to the compensation fiber of Example 6 and curve E corresponds to the compensation fiber of Example 7.

What is claimed is:

1. A module for compensating chromatic dispersion of a line optical fiber (1) in a plurality of contiguous and non-overlapping spectral bands each covering at least 30 nanometers, characterized in that the module includes a structure (9) carrying a plurality of submodules (4, 8) at least one of which is separable from the structure (9), which are disposed in series, which are interconnected by one or more connections (6) identifiable to the naked eye without optical measurement and accessible from the outside without damaging the module, and each of which includes a support to which is fixed at least one optical fiber (2, 7) for compensating chromatic dispersion, at least one optical fiber (2) of said plurality of compensation optical fibers (2, 7) having a compensation ratio from 0.9 to 1.1 for the center wavelength of one of said spectral bands, at least two submodules (4, 8) having compensation optical fibers (2, 7) of different kinds.

2. A compensation module according to claim 1, characterized in that the spectral bands are bands C and L.

3. A compensation module according to claim 1, characterized in that each compensation optical fiber has a compensation ratio from 0.9 to 1.1 for the center wavelength of one of the spectral bands.

4. A compensation module according to claim 1, characterized in that each connection comprises at least one weld.

5. A compensation module according to claim 1, characterized in that each connection comprises at least one connector.

6. A compensation module according to claim 1, characterized in that the submodules are independent of one another.

7. A compensation module according to claim 1, characterized in that the module comprises only two submodules.

8. A compensation module according to claim 1, characterized in that the compensation optical fibers of all the submodules are the same length.

9. A compensation module according to claim 1, characterized in that each submodule comprises only one compensation optical fiber.

10. A method of producing an optical transmission line, the method including a step of installing a line optical fiber (1) and a compensation module according to claim 1 for said line optical fiber.

11. The compensation module according to claim 1, wherein each compensation optical fiber has a negative chromatic dispersion.

12. A method of improving an optical transmission line comprising a line optical fiber (1) and a pre-existing and previously used compensation module for compensating chromatic dispersion of the line optical fiber in a given spectral band, including a module that comprises plurality of submodules, at least one of which is separable from the module, wherein the plurality of submodules are disposed in series and interconnected by one or more connections identifiable to the naked eye without optical measurement and accessible from the outside without damaging the module, and wherein each of the submodules includes a support to which is fixed at least one optical fiber for compensating chromatic dispersion in the given spectral band, the compensation optical fiber is the same kind for the plurality of submodules, the method comprising one or more exchange steps each consisting of removing from said module one of the plurality of submodules and replacing it with another submodule (8) whose compensation optical fiber (7) is of a different kind to the optical fiber (2) of the submodule (5) that has been removed, in order to obtain a module for compensating chromatic dispersion of a line optical fiber (1) in a plurality of contiguous and non-overlapping spectral bands each covering at least 30 nanometers; and wherein at least one optical fiber (2) in one of the remaining submodules has a compensation ratio from 0.9 to 1.1 for the center wavelength of one of the spectral bands.

13. A method according to claim 12 of improving an optical transmission line, characterized in that at least one of the original submodules (4) has not been subjected to and is not subjected to any of said exchange steps.

14. A method of operating a multi-band transmission optical fiber line, comprising:

providing a main optical fiber line;

providing a compensation module for compensating chromatic dispersion in the main optical fiber line; wherein the compensation module comprises a first submodule comprising a first dispersion compensation fiber having a first length, and a second submodule comprising a second dispersion compensation fiber having a second length; and wherein the first dispersion compensation fiber and the second dispersion compensation fiber are selected to compensate for chromatic dispersion in the main optical fiber line when operating in a first band so that the combined first length and second length compensates for chromatic dispersion in the first band more effectively than the first length alone and the second length alone;

initially transmitting information over the main optical fiber line in the first band;

later replacing the second submodule with a third submodule comprising a third dispersion compensation fiber having a third length, and wherein the third dispersion compensation fiber is selected to compensate for chromatic dispersion in the main optical fiber line when operating in a second band so that the combined first length and third length compensates for chromatic dispersion in the second band more effectively than the first length alone and the third length alone;

after replacing the second submodule with a third submodule, transmitting information over the main optical fiber line in the second band; and wherein the second and third submodules are removable from the module and exchangeable with each other; and wherein, when inserted in the module, the second and third submodules, respectively, are optically connected to the module by one or more connections identifiable to the naked eye without optical measurement and accessible from the outside without damaging the module.

15. The method of claim 14, wherein the first submodule and the second submodule are associated in series when optically connected to the module, and wherein the first submodule and the third submodule are associated in series when optically connected to the module.

16. The method of claim 14, wherein the first length equals the second length.

17. The method of claim 14, wherein the first band is C band.

18. The method of claim 17, wherein the second band is L band.

* * * * *